United States Patent [19]
Yasunobu et al.

[11] Patent Number: 5,471,559
[45] Date of Patent: Nov. 28, 1995

[54] METHOD AND APPARATUS FOR FUZZY KNOWLEDGE REASONING

[75] Inventors: Chizuko Yasunobu; Fumihiko Mori, both of Yokohama; Hiroshi Yamada, Kawasaki; Seiji Yasunobu, Yokohama; Ryuko Someya, Kawasaki, all of Japan

[73] Assignee: Hitachi, Ltd.

[21] Appl. No.: 500,067

[22] Filed: Mar. 27, 1990

[30] Foreign Application Priority Data

Mar. 31, 1989 [JP] Japan .................. 1-078219

[51] Int. Cl.$^6$ ..................................... G06F 9/44
[52] U.S. Cl. .................. 395/61; 395/3; 364/424.1
[58] Field of Search ..................... 364/513, 807, 364/424.1; 395/3, 61, 51, 60, 50, 61

[56] References Cited

U.S. PATENT DOCUMENTS

| | | | |
|---|---|---|---|
| 4,839,823 | 6/1989 | Matsumoto | 395/911 |
| 4,860,214 | 8/1989 | Matsuda et al. | 395/61 |
| 4,864,490 | 9/1989 | Nomoto et al. | 395/11 |
| 4,918,620 | 4/1990 | Ulug | 395/61 |
| 4,984,174 | 1/1991 | Yasunobu et al. | 395/61 |
| 4,989,162 | 1/1991 | Tanaka et al. | 395/51 |
| 4,999,833 | 3/1991 | Lee | 395/11 |
| 5,001,640 | 3/1991 | Matsumoto et al. | 364/426.01 |
| 5,019,979 | 5/1991 | Takahashi | 364/424.1 |
| 5,043,914 | 8/1991 | Nishiyama et al. | 395/51 |

FOREIGN PATENT DOCUMENTS

| | | | |
|---|---|---|---|
| 0332427A2 | 9/1989 | European Pat. Off. | |
| 60-204002 | 3/1986 | Japan | G05B 13/00 |
| 61-264412 | 4/1987 | Japan | G05B 23/02 |
| 61-264411 | 4/1987 | Japan | G05B 23/02 |

OTHER PUBLICATIONS

Ryuko Tsuda, et al., "a Proposal of a Knowledge Based System with Fuzzy Reasoning", 37th National Conference of Information Processing Society of Japan, 1988. Provided in Japanese-English translation unavailable.

Bunji Kaneko, et al., "Expert System for Investment", 4th Fuzzy Symposium, 1988, pp. 187–191. Provided in Japanese-English translation unavailable.

"Meiden Fuzzy Control System", 1988. Provided in Japanesep-English translation unavailable.

Waller, Larry. "Fuzzy Logic: It's Comprehensible, It'3 s Practical–And It's Commercial," *Electronics*, vol. 62, No. 3, Mar. 1989, pp. 102–103.

"Fuzzy Logic Processor for Real–Time Control," *Electronics Engineering*, vol. 61, No. 750, Jun. 1989, pp. 75 and 77.

Leung, K. S. and W. Lam. "the Implementation of Fuzzy Knowledge-Based System Shells," Proceedings, Tencon 87, 1987 IEEE Region 10 Conference, Computers and Communications Technology toward 2000, Seoul, Korea, vol. 2, Aug. 25, 1987, pp. 650–654.

Procyk et al., "A Linguistic Self-Organizing Process Controller", *Automatica*, v. 15 pp. 15–30, Jan. 1979.

"The structure, history, and future of successfull AI applications", IEEE potentials, 1986, Miller et al.

Primary Examiner—George B. Davis
Attorney, Agent, or Firm—Fay, Sharpe, Beall, Fagan, Minnich & McKee

[57] ABSTRACT

Fuzzy knowledge stored in a knowledge base is written into a memory. When fuzzy reasoning is executed by a fuzzy reasoning unit based on the content of the memory, a control unit in a central processing unit may modify the knowledge base in the memory. The control unit is programmed such that after it has modified the knowledge base in the memory, it causes a reasoning execution unit to repeatedly and automatically execute predetermined fuzzy reasoning by the number of times corresponding to the number of input data. The control unit also modifies the knowledge base and causes the reasoning execution unit to execute the fuzzy reasoning. By reading out the knowledge base in the memory, it is possible to verify the validity of the fuzzy knowledge without executing the simulation of the fuzzy reasoning. The fuzzy reasoning course of the reasoning execution unit may be stored in another memory. In this case, the control unit may display the fuzzy reasoning result on a display device in an expression easily understandable by a user, based on the content of the other memory.

31 Claims, 15 Drawing Sheets

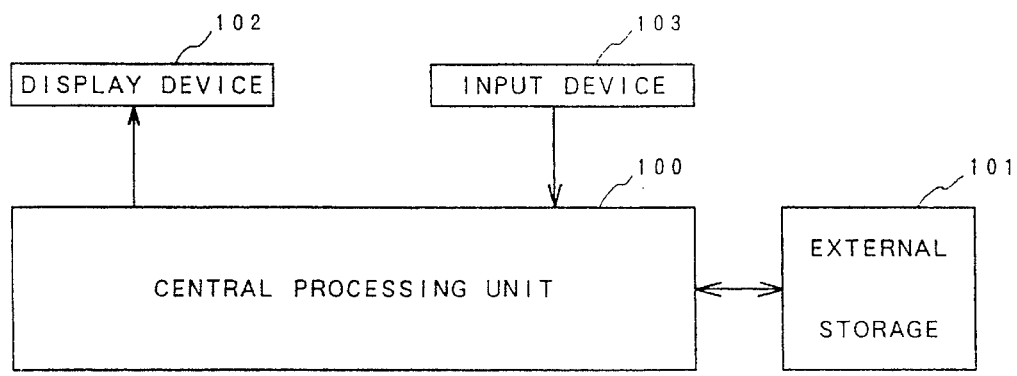
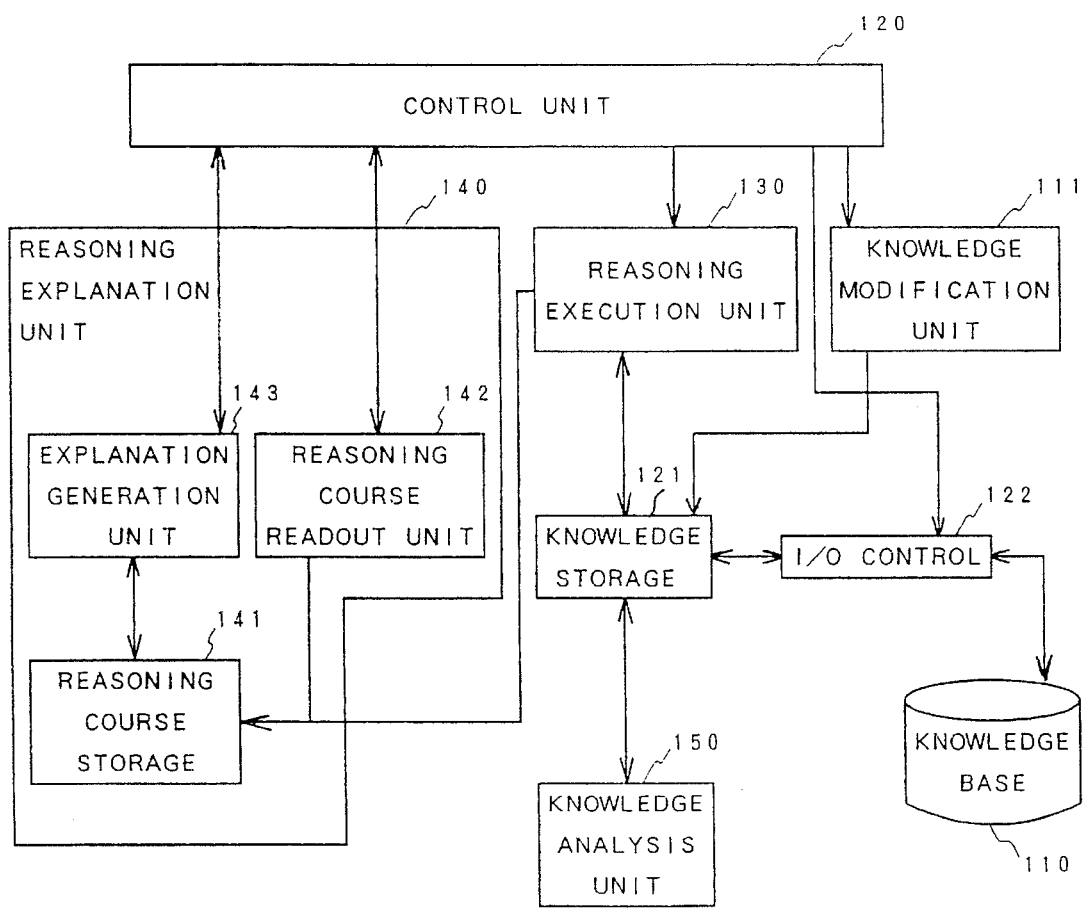

FIG. 2

SUBJECT TABLE

| SUBJECT | MINIMUM NUMBER | MAXIMUM NUMBER | DIVISION NUMBER |
|---|---|---|---|
| EXPENSE | 92 | 102 | 10 |
| PROFIT | 95 | 105 | 10 |
| HEADCOUNT | −5 | 5 | 10 |
| : | : | : | : |

PROPOSITION TABLE

| PROPOSITION | SUBJECT | PREDICATE | MEMBERSHIP FUNCTION |
|---|---|---|---|
| PROPOSITION1 | PROFIT | SMALL | (3, 97, −2) |
| PROPOSITION2 | PROFIT | NORMAL | |
| PROPOSITION3 | PROFIT | LARGE | (4, 103, −2) |
| : | : | : | : |

RULE TABLE

| RULE | CONDITION PART PROPOSITION | | | CONCLUSION PART PROPOSITION | |
|---|---|---|---|---|---|
| | EXPENSE | PROFIT | | HEADCOUNT | |
| RULE1 | LARGE | NORMAL | | DECREASE | |
| RULE2 | NORMAL | SMALL | | INCREASE | |
| : | : | : | : | : | |

LATEST MODIFICATION TIME

```
MODIFY-
FUZZY-KNOWLEDGE (SUBJECT TABLE, EXPENSE, MIN, EXPENSE-MIN)~410

MODIFY-                 421      423                  425
FUZZY-KNOWLEDGE (PROPOSITION, 1, MEMBERSHIP FUNCTION
                                                             427
                   (3, MEAN EXPENSE+STANDARD DEVIATION OF
                                                                420
                      EXPENSE, STANDARD DEVIATION OF EXPENSE))

START-                      431              433
FUZZY-REASONING (EXPENSE OF BRANCH OFFICE X, PROFIT OF
                                               435
                BRANCH OFFICE X, LOGICAL AND)~430

STORE-
FUZZY-KNOWLEDGE (FILE NAME)~440
```

FIG. 7

REASONING COURSE TABLE

| RULE ETC. | CONDITION PART PROPOSITION | | RULE ADAPTABILITY | CONCLUSION PART PROPOSITION |
|---|---|---|---|---|
| | 725 EXPENSE | 730 PROFIT | | HEADCOUNT ~720 |
| INPUT | 701<br>96 | 702<br>97 | | |
| RULE 1 | 0.2 | 0.4 | 0.2 | (0.04, 0.12, ... 0.0, 0.0, 0.0) |
| RULE 2 | 750<br>0.8 | 710<br>1.0 | 735<br>0.8 | (0.0, 0.0, ... 0.8, 0.48, 0.16)~740 |
| 795 : | : | : | : | : |
| OVERALL | | | | 790<br>(0.04, 0.12, ... 0.8, 0.48, 0.16)~760 |
| CONCLUSION | | | | 780<br>1.5, 0.7 |

FIG. 8

$$\begin{cases} \text{FUZZY-REASONING-INTERIUM-RESULT (RULE2, EXPENSE)} \sim 810 \\ \text{FUZZY-REASONING-INTERIUM-RESULT (RULE1, ADAPTABILITY)} \\ \text{FUZZY-REASONING-INTERIUM-RESULT (RULE1, HEADCOUNT)} \\ \text{FUZZY-REASONING-INTERIUM-RESULT (OVERALL, HEADCOUNT)} \end{cases}$$

with labels 820, 830 above RULE2 and EXPENSE.

FIG. 14A
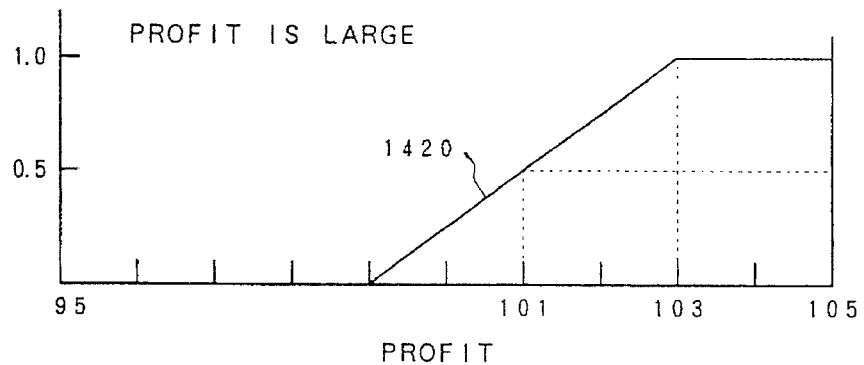
FIG. 14B
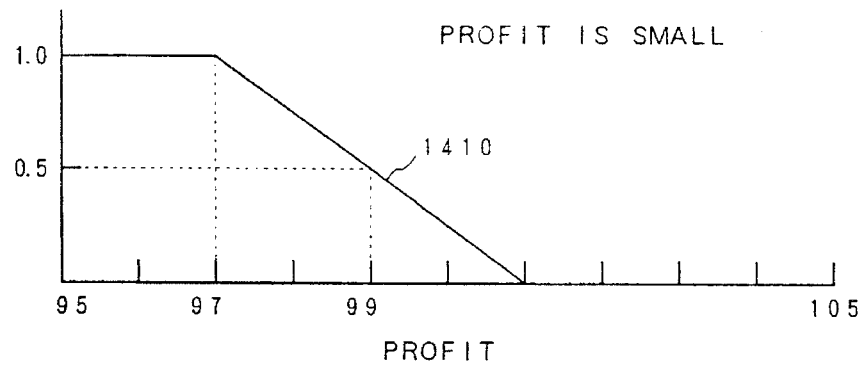
FIG. 14C
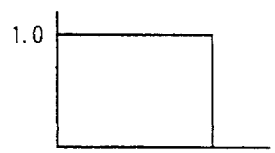
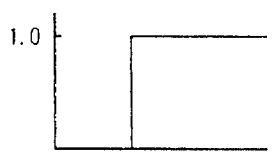
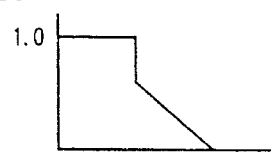
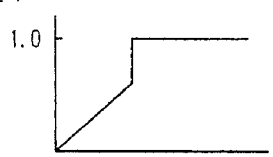
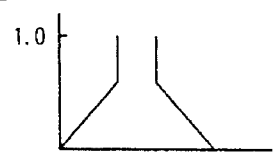

CANDLE BASE

| PROPOSITION | SUBJECT | PREDICATE | MEMBERSHIP FUNCTION |
|---|---|---|---|
| PROPOSITION1 | REAL BODY | LONG | (4, 20, −10) |
| PROPOSITION2 | UPPER SHADOW | LONG | (4, 10, −5) |
| PROPOSITION3 | LOWER SHADOW | LONG | (4, 10, −5) |
| PROPOSITION4 | PRICE | GOES UP | (7, A1, −10, −10) |
| PROPOSITION5 | PRICE | GOES DOWN | (7, A2, −10, −10) |
| PROPOSITION6 | PRICE | GOES UP A LITTLE | (7, A3, −10, −10) |

PROPOSITION TABLE

FIG. 16C

| | CONDITION PART PROPOSITION | | | CONCLUSION PART PROPOSITION |
|---|---|---|---|---|
| | REAL BODY | UPPER SHADOW | LOWER SHADOW | PRICE |
| RULE 1 | LONG | | | GOES UP |
| RULE 2 | | LONG | | GOES DOWN |
| RULE 3 | | | LONG | GOES UP A LITTLE |

RULE TABLE

FIG. 16D

| NUMBER | REAL BODY | UPPER SHADOW | LOWER SHADOW | RESULT |
|---|---|---|---|---|
| 1 | 24 | 10 | 2 | 10 |
| 2 | 18 | 5 | 13 | 5 |
| ⋮ | ⋮ | ⋮ | ⋮ | ⋮ |

TEACHER DATA TABLE

FIG. 16E

| A1 | A2 | A3 | ERROR SQUARE SUM |
|---|---|---|---|
| 20 | 10 | 8 | 100 |

BEST PARAMETER CANDIDATE TABLE

METHOD AND APPARATUS FOR FUZZY KNOWLEDGE REASONING

BACKGROUND OF THE INVENTION

The present invention relates to a reasoning method and apparatus in a fuzzy reasoning system.

In prior art fuzzy reasoning such as that disclosed in "A Proposal of a Knowledge Based System with Fuzzy Reasoning" by Tsuda, 37th National Conference (1988) of Information Processing Society of Japan, it is necessary for a user to edit a fuzzy knowledge base in order to define or modify it before a start of reasoning.

In a prior art fuzzy reasoning such as that disclosed in "Security Investment Expert System" by B. Kaneko, 4th Fuzzy Symposium 1988, pp 187–191, a portion of data in the course of reasoning is difficult to understand for a user who is not familiar with the fuzzy reasoning.

In a prior art fuzzy knowledge base building support method such as that disclosed in "MEIDEN Fuzzy Control System" 1988 which builds the MEIDEN Expert Control System, knowledge is verified by actually conducting the fuzzy reasoning for simulation. It is thus not possible to determine the validity of the current fuzzy knowledge without starting the fuzzy reasoning system.

In summary, as seen from the above prior art, no attention has been paid to dynamically defining the fuzzy knowledge and it has been necessary for a person to define or modify the fuzzy knowledge as an editor before the fuzzy reasoning system can be started.

In the prior art method of displaying the message to the user, no consideration has been made to the explanation of the reasoning result to a person who is unaware of the logic of the fuzzy reasoning. Thus, such a person usually cannot understand the explanation.

In the prior art method of verifying the validity of the defined fuzzy knowledge, no consideration has been made as a basis for the static determination of the fuzzy validity of the knowledge so that the knowledge must be dynamically verified by the simulation.

SUMMARY OF THE INVENTION

It is a first object of the present invention to provide method and apparatus for fuzzy reasoning which allow dynamic definition of the fuzzy knowledge.

It is a second object of the present invention to provide method and apparatus for fuzzy reasoning which display the explanation a reasoning result in a form understandable to anyone.

It is a third object of the present invention to provide method and apparatus for fuzzy reasoning which can analyze the fuzzy knowledge without executing the fuzzy reasoning.

It is a fourth object of the present invention to provide a fuzzy knowledge base building support tool which is effective to the application of the fuzzy reasoning in a business field.

In order to achieve the first object, the present invention provides a knowledge modification unit for modifying the fuzzy knowledge, and a control unit which accesses both the knowledge modification unit and a fuzzy reasoning execution unit. In order to prevent the reduction of the reasoning speed due to the storing of the fuzzy knowledge in a knowledge storage in a modifyable form, a function to determine the necessity of compilation may be further provided. A knowledge storage function may be further provided in the knowledge modification unit so that the dynamically modified fuzzy knowledge may be stored in the knowledge base.

In order to achieve the second object, the present invention provides a reasoning course storage unit for storing the course of reasoning, and an explanation generation unit for analyzing the reasoning course to generate an explanation in a natural language.

In order to achieve the third object, the present invention provides a knowledge analysis unit which illustrates relation of the fuzzy knowledge.

In order to achieve the fourth object, the present invention provides, in addition to the control unit and the knowledge base which a user already has, the reasoning execution unit, the knowledge modification unit, the reasoning explanation unit and the knowledge analysis unit to complete a fuzzy reasoning apparatus. Where the reasoning explanation unit is provided as a tool, a reasoning course readout unit which can be accessed by the control unit may further be provided in order to allow the user to generate his/her own explanation.

In accordance with the present invention, the control unit accesses the knowledge modification unit and the reasoning execution unit in accordance with a process which the user of the fuzzy reasoning apparatus has incorporated therein. Thus, it is possible to conduct the reasoning based on the defined fuzzy knowledge after dynamic modification of the fuzzy knowledge. The reasoning execution unit compiles the fuzzy knowledge only when the fuzzy knowledge is modified after the previous execution of the reasoning. Accordingly, where the fuzzy knowledge has not been modified, no extra time is required. The reasoning execution unit stores the reasoning course in the reasoning course storage. The explanation generation unit is started by the control unit after the reasoning execution unit has been accessed, analyzes the reasoning course storage, extracts a condition which significantly affects the conclusion and outputs it as a natural language sentence so that the user can easily understand the explanation.

The control unit also starts the reasoning course readout unit in accordance with the built-in process to read out the information from the reasoning course storage. Thus, other explanation may be prepared based on this information.

The knowledge analysis unit analyzes the fuzzy knowledge and graphically illustrates the results. Thus, the validity of the fuzzy knowledge can be verified by referencing the charts.

The present invention has the advantage that the control unit may refer to the knowledge storage and modify the content thereof. It further has the advantage that the control unit may refer to the reasoning course storage.

BRIEF DESCRIPTION OF THE DRAWINGS

FIG. 1A shows a block diagram of a system configuration of a first embodiment of the present invention;

FIG. 1B shows a block diagram of a configuration of the present invention;

FIG. 2 shows a configuration of a reasoning knowledge storage;

FIG. 7 shows a configuration of a reasoning course storage;

FIG. 8 illustrates the use of a reasoning course readout unit;

FIGS. 14A, 14B and 14C show examples of a membership function;

FIGS. 16A, 16B, 16C, 16D and 16E illustrate operation of a fourth embodiment of the present invention.

DESCRIPTION OF THE PREFERRED EMBODIMENTS

Figures 3, 4:
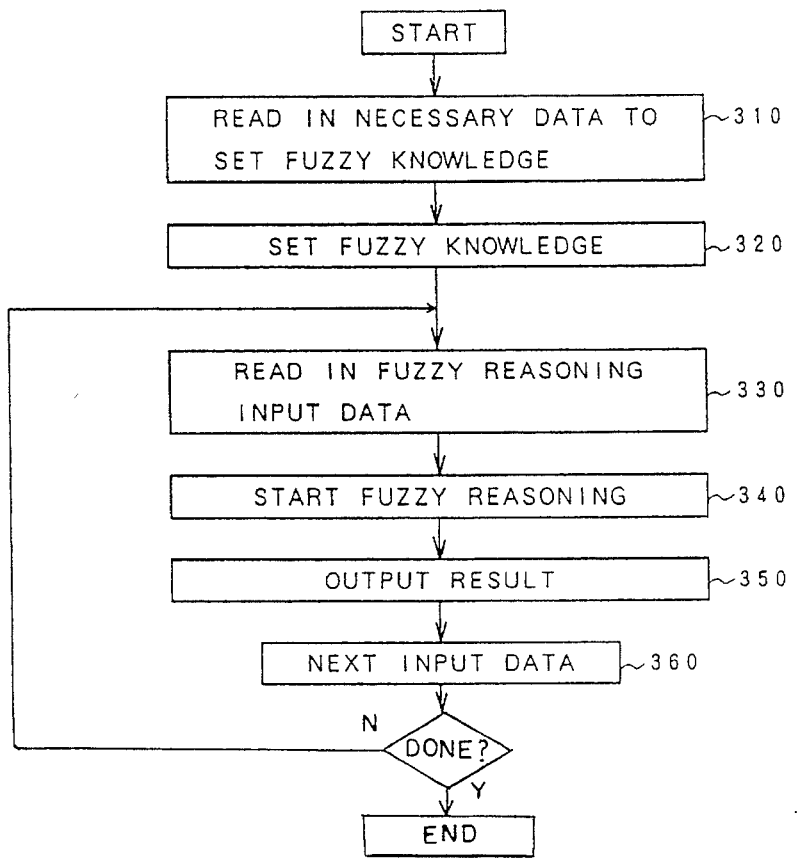
FIG. 3 shows a flow chart of a process of a control unit.
FIG. 4 shows an example of definition of the control unit.

With reference to the first to third embodiments of the present invention which are shown for the purposes of illustration and not for limitation thereto, the diagnosis of branch offices in a financial organization is explained with reference to FIGS. 1 to 10 and FIGS. 14 and 15.

Referring first to FIG. 1A, a system configuration of the first embodiment of the present invention is explained. It comprises a central processing unit 100 which carries out the fuzzy reasoning and various other processings, an external storage 101 which stores the fuzzy knowledge and a database, a display device 102 which displays explanation and analysis results, and an input device 103 which starts the process.

Referring now to FIG. 1B, a configuration of a fuzzy reasoning apparatus of the present invention is explained. A knowledge base 110 in the external storage 101 stores the fuzzy knowledge in files in a form understandable and editable to a known operator. A control unit 120 in the central processing unit 100 is started through the input device 103 and accesses a knowledge modification unit 111, a reasoning execution unit 130, an explanation generation unit 143 and a reasoning course readout unit 142 in accordance with a preset procedure. A knowledge storage 121 comprises a memory which is in the central processing unit 100, and stores the fuzzy knowledge stored in the knowledge base 110 through an input/output control unit 122 in a form processable by the computer. The knowledge modification unit 111 modifies the knowledge storage 121. The reasoning execution unit 130 executes the fuzzy reasoning based on the fuzzy knowledge stored in the knowledge storage 121 and outputs the reasoning course to the reasoning course storage 141. A reasoning explanation unit 140 comprises the reasoning course storage 141, the reasoning course readout unit 142 which delivers the information of the reasoning course storage 141 to the control unit, and the explanation generation unit 143 which outputs the explanation of the reasoning to the display device 102 in accordance with the reasoning course storage 141. A knowledge analysis unit 150 is started through the input device 103, and analyzes the content of the knowledge storage 121 and outputs the results to the display device 102.

Each unit may be realized by a program module.

Referring to FIG. 2, a configuration of the knowledge storage 121 is explained. A subject table 200 contains a name 202 of data (subject) which is referenced by a condition part of a fuzzy rule or determined by a conclusion part, and a minimum value 204, a maximum value 206 and a division number 208 as information used to define a membership function. A proposition which is determined by a subject 224 in the subject table 200 and a predicate 226, and a parameter 228 which defines the membership function. In one example 230 of the parameters (3, 97, –2) which define the membership function, a type of function is 3 (right-hand down), the function is 1.0 at less than 97 and starts to fall from 97, and reaches 0.5 at 97+②=99 (where ② represents an absolute value of 2).

In FIG. 14B, 1410 shows a graph of the membership function.

Similarly, parameters 232 (4, 103, –2) define a membership function shown by a graph 1420 in FIG. 14A.

The types of function include 3 (right-hand down), 4 (left hand down) and that shown in FIG. 14C.

A rule table 240 contains a fuzzy rule. A rule 2 (column 250) shows.

If "expense" is "normal" and "profit" is "small", then "increase" "headcount".

It is stored in the knowledge base in this form a latest modification time 260 stores a time at which the fuzzy knowledge of the knowledge storage 121 is most recently modified by the knowledge modification unit 111. The time is updated each time even a portion of the knowledge is modified.

An operation of the first embodiment of the present invention is now explained with reference to FIGS. 3 to 10.

An overall operation of the control unit is first explained with reference to FIGS. 3 and 4. FIG. 3 shows a flow chart of the process of the control unit 120. FIG. 4 shows an example of statement in a program which describes the operation of the control unit 120. It is a portion of the program written by a user of the fuzzy reasoning apparatus by using an editor. In the first embodiment of the present invention, if the modification of the fuzzy knowledge is instructed in the program which describes the process of the control unit 120, a plurality of fuzzy reasonings may be repeatedly executed without stopping the fuzzy reasoning apparatus. In a step 310, the control unit 120 reads in a maximum value, a minimum value, a mean value and a standard deviation of all branch office data relating to the expense and the profit which are the subject 202 in the subject table 200, from the branch office database (data for each branch office of a bank) which is in the external storage 101, as the data necessary to modify the fuzzy knowledge. It should be noted that the control unit 120 can periodically or automatically at an appropriate timing read in necessary data in order to modify the fuzzy knowledge. It is not necessary for the user to instruct the modification through the input device 103. In a step 320, in order to set the fuzzy knowledge in accordance with the fetched data, the knowledge modification unit 111 is started by parameters 410 or 420 to modify the fuzzy knowledge in the knowledge storage 121. In a step 330, as input data for the first fuzzy reasoning, the expense and profit data of a first branch office is read from the branch office database. In a step 340, the reasoning execution unit 130 is started by 430. In a step 350, the explanation generation unit 143 is started to display the explanation of the reasoning result. In a step 360, if there is input data of other branch offices, the process goes back to the step 330 to diagnose the next data. If there is no other input data, the process terminates.

An operation of the knowledge modification unit 111 is now explained. The knowledge modification unit 111 is started by the control unit 120 in the form of parameters 410 or 420 in FIG. 4 to modify the fuzzy knowledge in the knowledge storage 121. It is also started in the form of parameter 430 to modify the fuzzy knowledge in the knowledge base.

Figure 5A:
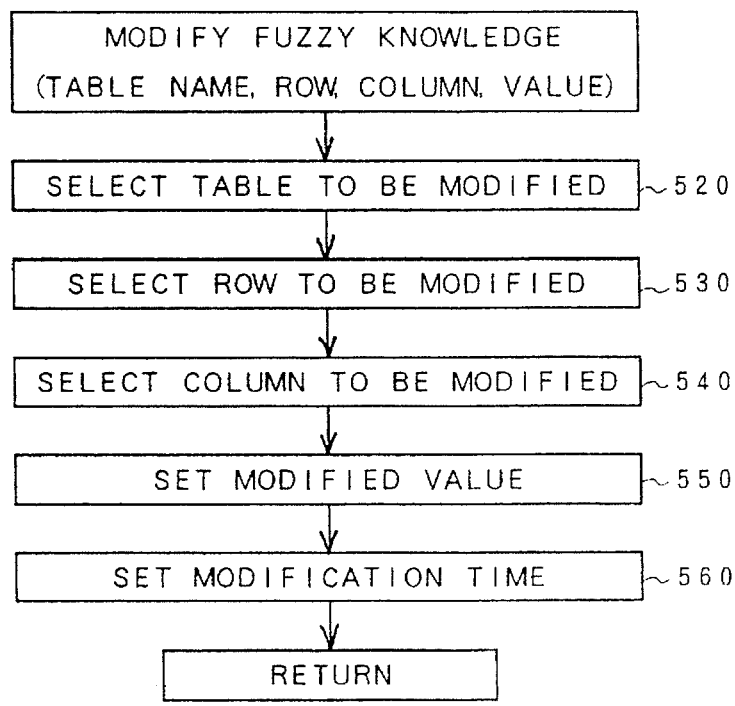
FIGS. 5A and 5B show flow charts of a process of a knowledge modification unit.

Assuming that it is called by the parameter 420, the operation thereof is explained with reference to FIG. 5A. In a step 520, the proposition table 220 of the knowledge storage 121 is selected as a table to be modified by a proposition 421 of a first parameter. In steps 530 and 540, the modification of a column 228 of a membership function of the first proposition 1 (222' in FIG. 2) of the proposition table 220 is determined by 1 of the second parameter (423 in FIG. 4) and the membership function 425 of the third parameter. In a step 550, (3, 97, −2) (230 in FIG. 2) are changed to (3, mean expense+ standard deviation of expense, standard deviation of expense) (427 in FIG. 4) of the fourth parameter. The mean expense and the standard deviation of expense indicate a mean value and a standard deviation of expenses of all branch offices, respectively, read in the step 320. In a step 560, a current time is entered in the column 260 of latest modification time.

In a similar manner, a new proposition may be defined by adding or modifying columns of the subject 224 and the predicate 226 of the proposition table. By modifying the subject table, a new subject (data) and a range of data may be modified. By modifying the rule table, a proportion to be referenced or determined by the rule may be changed or a new rule may be added. This modification is made not by the user through the editor but by the control unit 120 in accordance with the program.

Figure 5B:
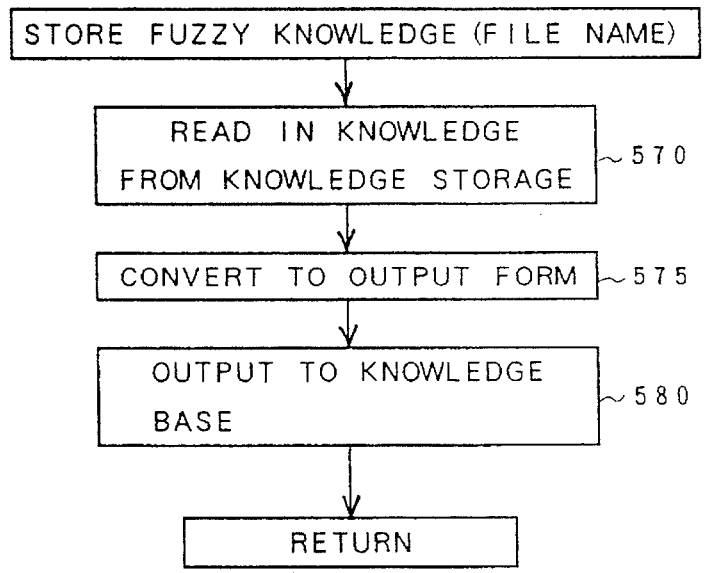

When the knowledge modification unit 111 is called by parameter 440 in FIG. 4, it reads in the content of the knowledge storage 121 as shown in FIG. 5B (step 570), converts it to an output form (step 575) and stores it in the knowledge base 110 (step 580). Thus, the modified fuzzy knowledge can be returned to the knowledge base 110.

Assuming that the reasoning execution unit 130 is called by the parameter 430 of FIG. 4 by the control unit 120, the operation thereof is explained with reference to FIG. 6A. In a step 610, the previous compilation time (which is set in a step 620) and the latest modification time 260 of FIG. 2 are compared. If the latest modification time 260 is more recent, the process proceeds to the step 620 where the content of the knowledge storage 121 is compiled and the compilation time is updated. Then, the process proceeds to a step 650 where the fuzzy reasoning is executed in accordance with a compiled code, the expense 431 of the branch office x of the first parameter, the profit 433 of the branch office x of the second parameter, and the parameter logical AND 435 which determines the fuzzy reasoning method. In this manner, the number of times of execution of compilation is minimized to minimize the reduction of the speed of the fuzzy reasoning.

Figure 15:
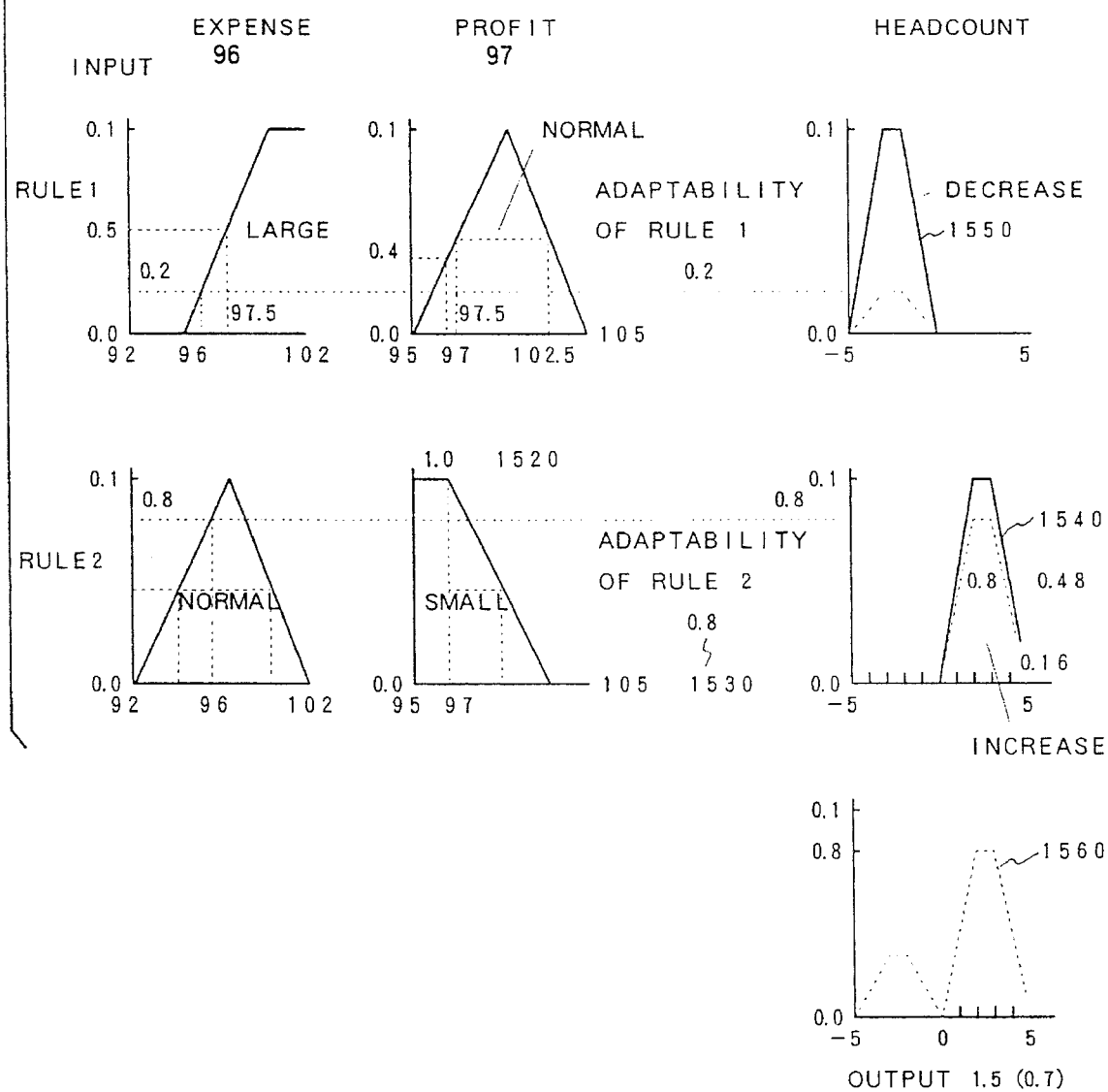
FIG. 15 illustrate a rule and a reasoning execution process.

An operation of the fuzzy reasoning by the reasoning execution unit 130 and a configuration of the reasoning course storage 141 are now explained with reference to FIGS. 6B and 7. Examples of fuzzy knowledge and input value used in the explanation are shown in FIG. 15. In a step 660, the expense and profit data 96 (701 in FIG. 7) and 97 (702 in FIG. 7) are read in as the input data for the reasoning. In a step 665, a value of the membership function of the condition part of the rule, to the input value is calculated. For example, the value 1.0 (710 in FIG. 7) in the profit column of the rule 2 corresponds to the value (1520 in FIG. 15) when the input value of the membership function (222 in FIG. 2) of this corresponding predicate "small" (242 in FIG. 2) of the rule table 240 is 97 (702 in FIG. 7). In a step 670, the adaptability of the rule is calculated based on the values of the membership functions of the condition part of the rule. For example, 0.8 (735 in FIG. 7) in the adaptability column of the rule 2 represents the adaptability to the input value of the rule 2 (1530 in FIG. 15).

In the fuzzy reasoning, the conclusions of the respective rules are summed with weights in accordance with the adaptability. It is a minimum value of the adaptabilities 0.8 (750 in FIG. 7) and 1.0 (710 in FIG. 7) of the proposition of the condition part. In a step 675, the membership function of the subject of the conclusion part of the rule is reduced in accordance with the adaptability of the rule. In the headcount column of the rule 2, (0.0, 0.0, . . . , 0.8, 0.48, 0.16) (740 in FIG. 7) indicates a membership function having a function value reduced in accordance with the adaptability 0.8, based on the membership function of "increase" (244 in FIG. 2) which is the corresponding predicate of the rule table 240 (see 1540 in FIG. 15). In a step 680, the membership functions of the subjects of the conclusion parts of all of the rules are logically ORed to decide the headcount column (0.04, 0.12, . . . , 0.8, 0.48, 0.16) (760 in FIG. 7) of the total row. In FIG. 7, 760 indicates the membership function which is a conclusion for the headcount (see 1560 in FIG. 15). In a step 685, a center of gravity of the membership function 760 is calculated. The headcount column 780 in the conclusion row indicates that the value 1.8 for the headcount is weighted by 0.7 to make a conclusion.

The reasoning explanation unit is now explained. The operation of the explanation generation function 143 is first explained with reference to FIGS. 7, 9 and 10. In a step 910, the headcount 720 (1025 in FIG. 12) is set as a subject whose conclusion is to be explained. There is only one such subject in the present example. In a step 920, where the headcount value is 1.5 (1030 in FIG. 10), "increase" (1035 in FIG. 10) is selected as a word for the explanation, that is, a predicate which most fits among the predicates "increase" (1550 in FIG. 15) and "decrease" (1540 in FIG. 15) for the headcount (the membership function value to 1.5 is large). In a step 930, 0.8 (790 in FIG. 7) is selected as a maximum value of the membership function 760 (1560 in FIG. 15) of the conclusion. In a step 940, the rule 2 is selected as a rule based on which the maximum value 0.8 is determined (see 1540 and 1550 in FIG. 15). In a step 950, the subject "profit" (730 in FIG. 7) which is a high membership function value 1.0 (710 in FIG. 7) is selected from the propositions of the condition part of the rule 2 (1040 in FIG. 10). In a step 960, the input value 97 (702 in FIG. 7, 1045 in FIG. 10) for the profit is selected, and "small" (1050 in FIG. 10) is selected as a predicate which most fits among the predicates for the profit, "large", "normal" and "small". The information extracted in the above steps is applied to the format of 1010 in FIG. 10 to display explanatory text 1020 on the display unit 102. In this manner, the result of the fuzzy reasoning can be displayed in an expression which is easy to understand for the user, in accordance with the content of the reasoning course storage 141. It is noted that a printer for outputting the result of the fuzzy reasoning may be used instead of the display unit in the embodiment.

The operation of the reasoning course readout unit 142 is now explained with reference to FIG. 8 which illustrates a method of accessing by the control unit 120. The reasoning course is read out by starting a function of fuzzy-reasoning-interium-result. This function is started by designating two parameters. The first parameter, rule 2 (820 in FIG. 8) means the row 795 of the rule 2 of the reasoning course table of FIG. 7. The second parameter, expense (830 in FIG. 8) means the expense column 725 of the table. If the function is started with the column 810, it returns 0.8 (750 in FIG. 7).

Figure 11:
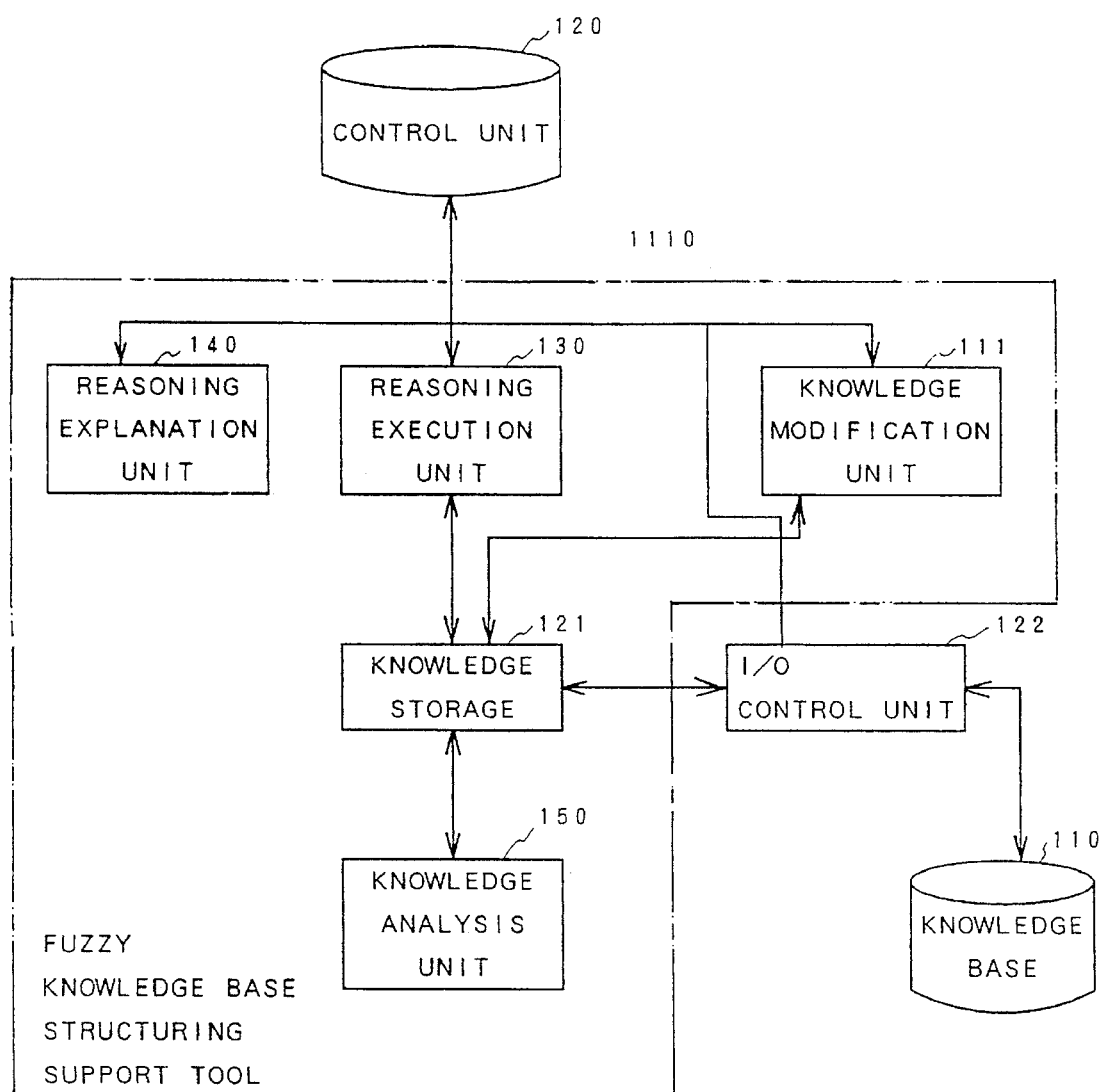
FIG. 11 shows a block diagram of a configuration of a second embodiment of the present invention.

A second embodiment of the present invention is now explained with reference to FIG. 11 to 13.

The first embodiment is the system configuration which applies the fuzzy reasoning. The second embodiment relates to a fuzzy knowledge base building support tool which may be commonly used for the development of various application systems.

A configuration of the second embodiment is explained with reference to FIG. 11. A fuzzy knowledge base building support tool 1110 comprises a reasoning execution unit 130, a reasoning explanation unit 140, a knowledge analysis unit 150, a knowledge modification unit 111 and a knowledge storage 121. The control unit 120 and the knowledge base 110 are separated and they utilize the hardware to which the second embodiment is applied.

The operation is the same as that of the first embodiment.

Figure 12A:
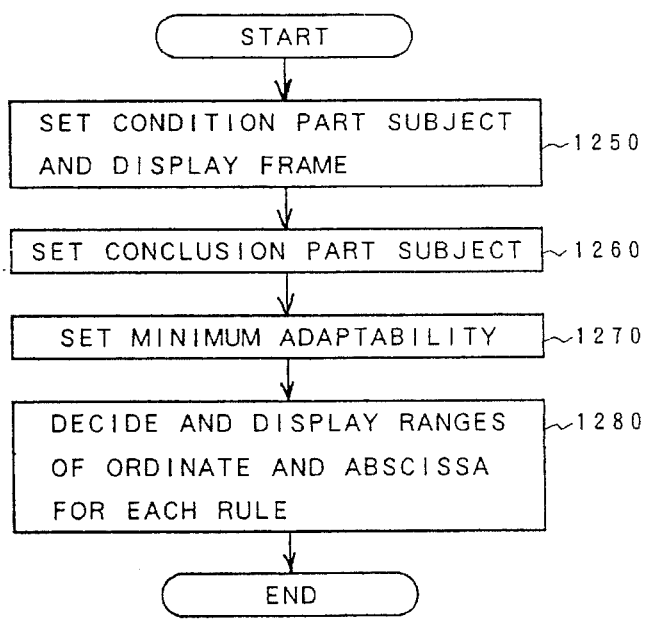
FIG. 12A shows a flow chart of a process of a knowledge analysis unit.
Figure 12B:
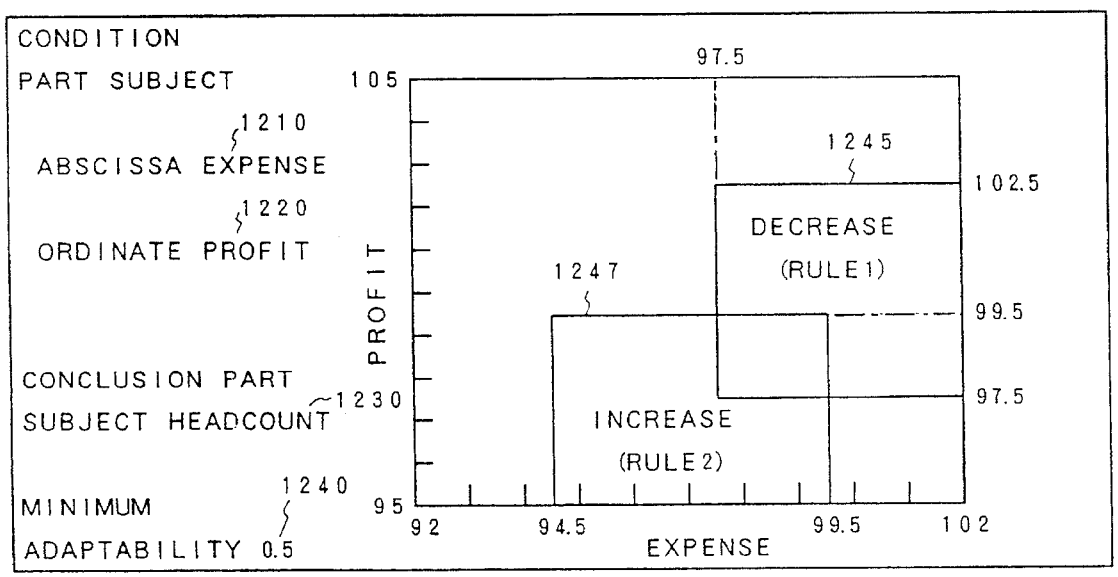
FIG. 12B shows an execution screen of the knowledge analysis unit.

The operation of the knowledge analysis unit 150 is now explained with reference to FIG. 12A which shows a process flow and FIG. 12B which shows a screen of the execution result. In a step 1250, data for an abscissa and an ordinate of an output analysis chart (rule distribution chart) are selected from the subjects of the condition parts of the rules. For example, a user of the tool designates "expense" (1210 in FIG. 12B) as the abscissa and "profit" (1220 in FIG. 12B) as the ordinate. Minimum values and maximum values of "expense" and "profit" are examined with reference to the subject table of FIG. 2, and frame and scales of the analysis chart are displayed. In a step 1260, data whose rule distribution is to be observed is selected from the subjects of the conclusion parts of the rules. For example, the user of the tool designates "headcount" (1230 in FIG. 12B). With reference to the rule table and the proposition table of FIG. 2, the rules 1 and 2 of FIG. 15 and the membership functions to be referenced by those rules are grasped. In a step 1270, a minimum adaptability is set as a range for each rule to be shown on the analysis chart. For example, the user of the tool designates 0.5 (1230 in FIG. 12B). In a step 1280, a range in which the adaptability of each rule is now less than 0.5 is determined and displayed. For example, the adaptability of the rule 1 is now less than 0.5 when both membership function values of "expense is large" and "profit is normal" are no less than 0.5. Referring to FIG. 15, "expense is large" occurs when the expense is no less than 97.5, and "profit is normal" occurs when the profit is no less than 97.5 and no larger than 102.5. This range 1245 is displayed on the display device 102 as the analysis chart. Similarly, for the rule 2, a range 1247 in which the expense is no less than 94.5 and no larger than 99.5 and the profit is no less than 99.5 is displayed. In this manner, the manner of setting the rule may be statistically discussed based on the knowledge base in the knowledge storage 121 without starting the fuzzy reasoning. For example, it is seen from the analysis chart of FIG. 12B that the rule setting for a case where the expense is small and the profit is large is not sufficient.

A third embodiment of the present invention is now explained with reference to FIGS. 13A and 13B. In the first and second embodiments, all processes are executed on the central processing unit 100. In the third embodiment, in order to attain a high speed operation, only the fuzzy reasoning is executed by the fuzzy reasoning processor 1340.

Figure 13A:
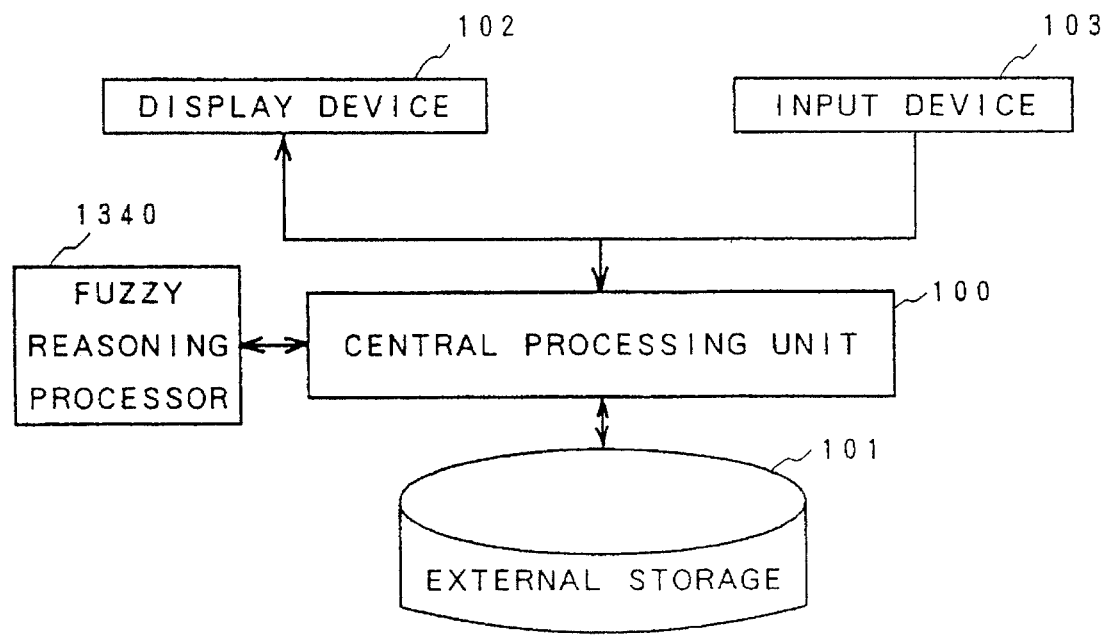
FIG. 13A shows a block diagram of a system configuration of a third embodiment.
Figure 13B:
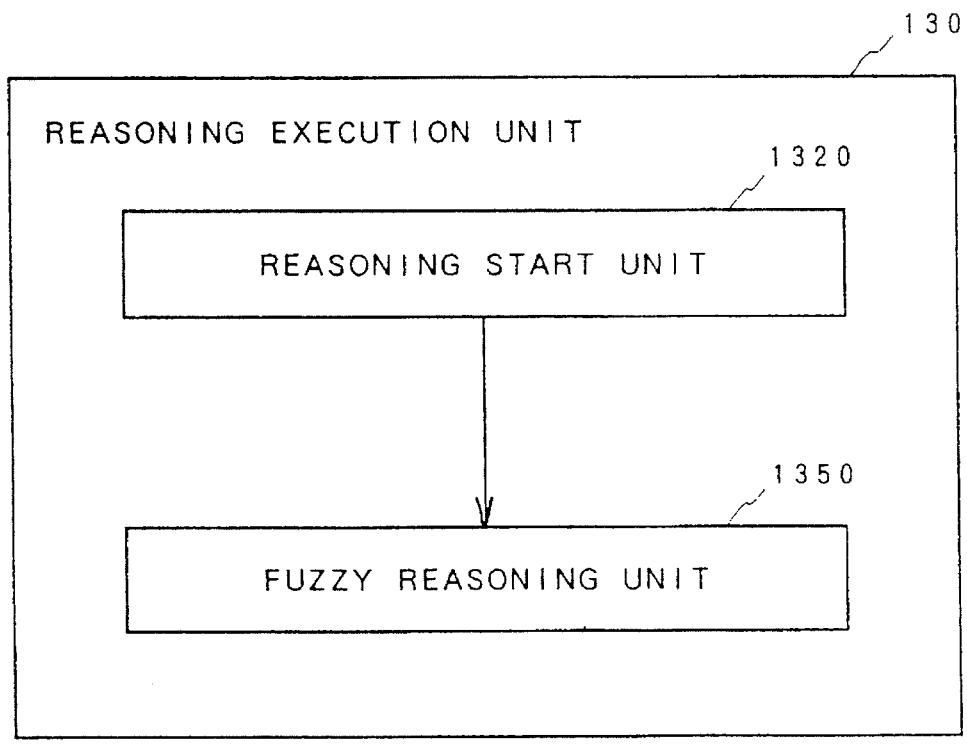
FIG. 13B shows a block diagram of a configuration thereof.

A system configuration of the third embodiment is shown in FIG. 13A. The fuzzy reasoning processor (fuzzy chip) 1340 has an independent processor and it is started by the central processing unit 100. A portion of the configuration of the third embodiment is shown in FIG. 13B. It is the same as that of FIG. 1B or FIG. 11 except for the reasoning execution unit 130. The reasoning start unit 1320 is on the central processing unit 100. The fuzzy reasoning unit 1350 is on the fuzzy reasoning processor 1340 and it is started by the reasoning start unit 1320.

Figure 6A:
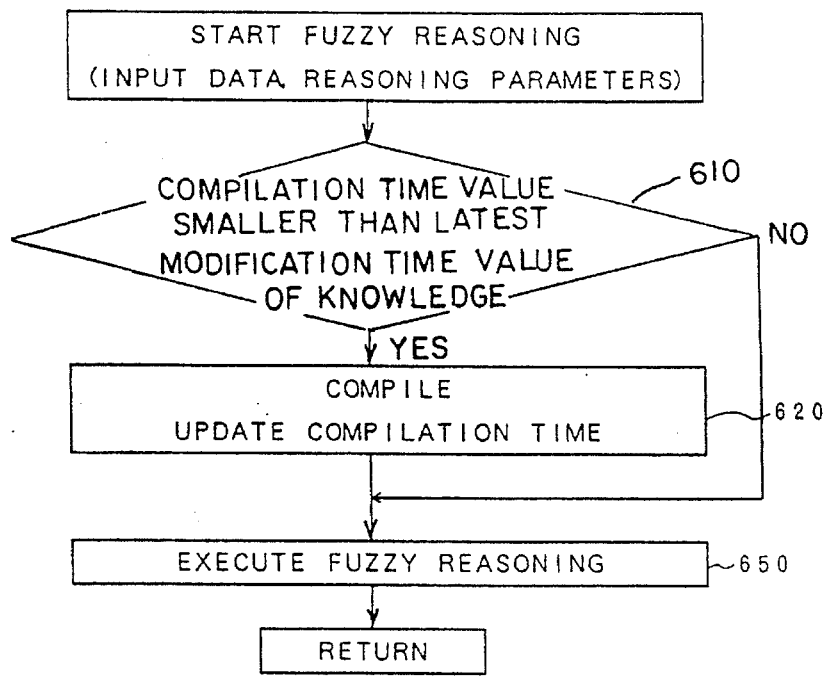
FIGS. 6A and 6B show flow chart of a process of a reasoning execution unit.
Figure 6B:
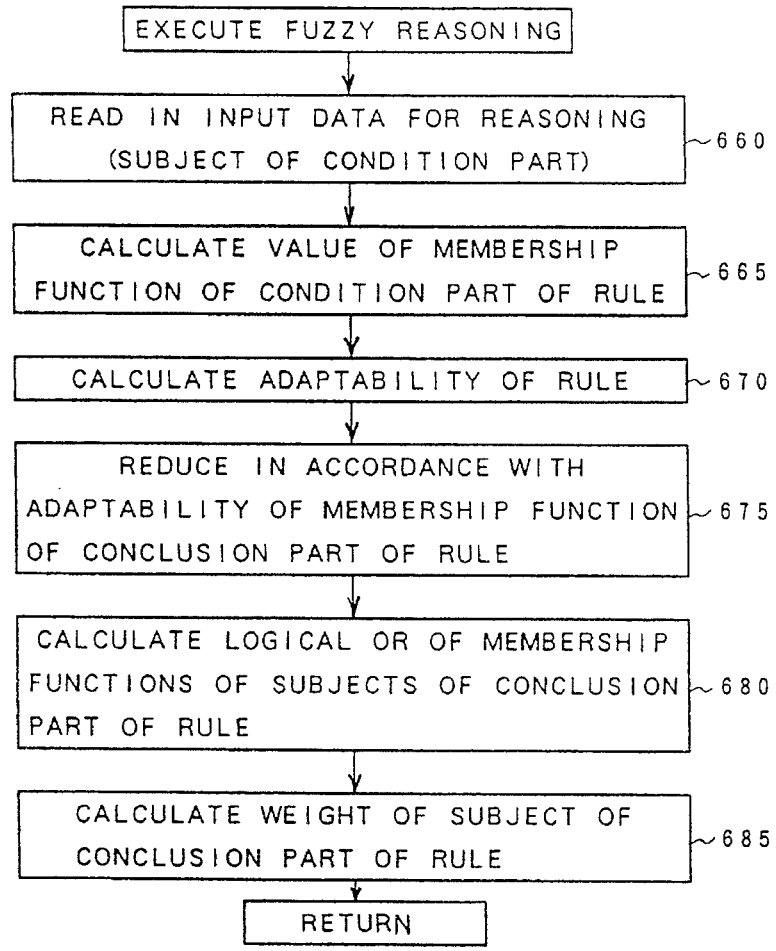
Figure 9:
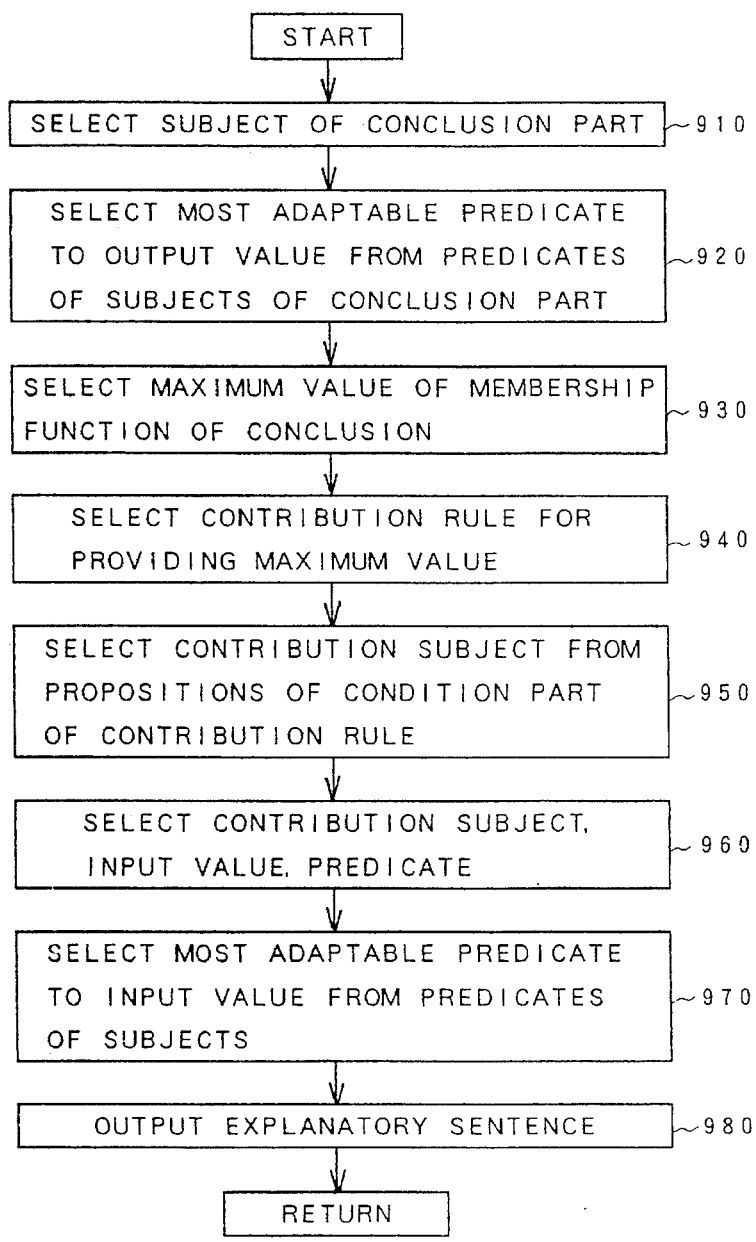
FIG. 9 shows a flowchart of a process of an explanation generation unit.
Figure 10:
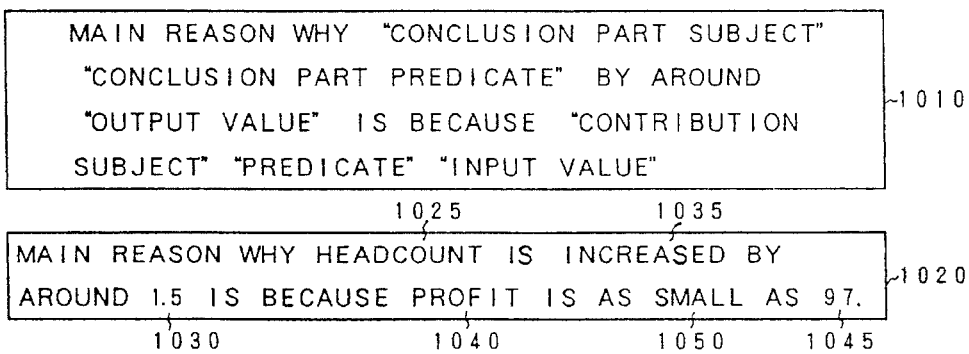
FIG. 10 shows an output screen of the explanation unit.

The operation of the reasoning start unit 1320 is the same as that in the steps 610 and 620 of FIG. 6A. In the step 650, the fuzzy reasoning unit 1350 is merely started. The operation of the fuzzy reasoning unit 1350 is the same as the process flow shown in FIG. 6B.

A fourth embodiment of the present invention in which an optimum parameter value of the membership function is learned from teacher data is now explained with reference to FIGS. 16 and 17. As an example of the fuzzy knowledge, a rule for predicting movement of price from a shape of a candle base in technical analysis of a chart for stock market quotations is used.

Figures 16A, 16B:
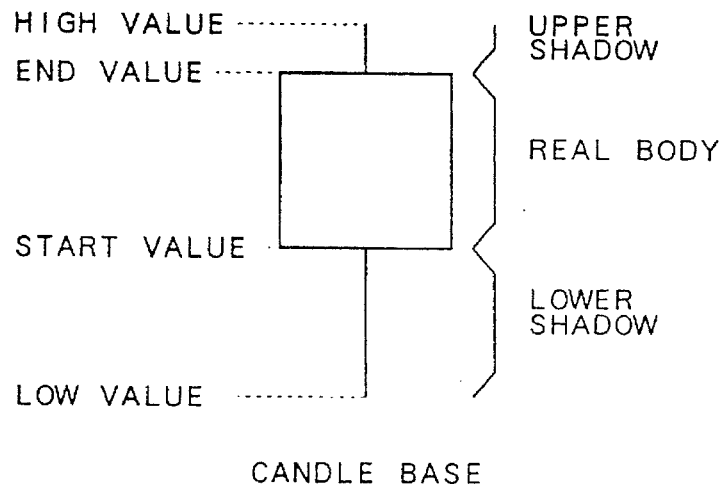
Figure 17:
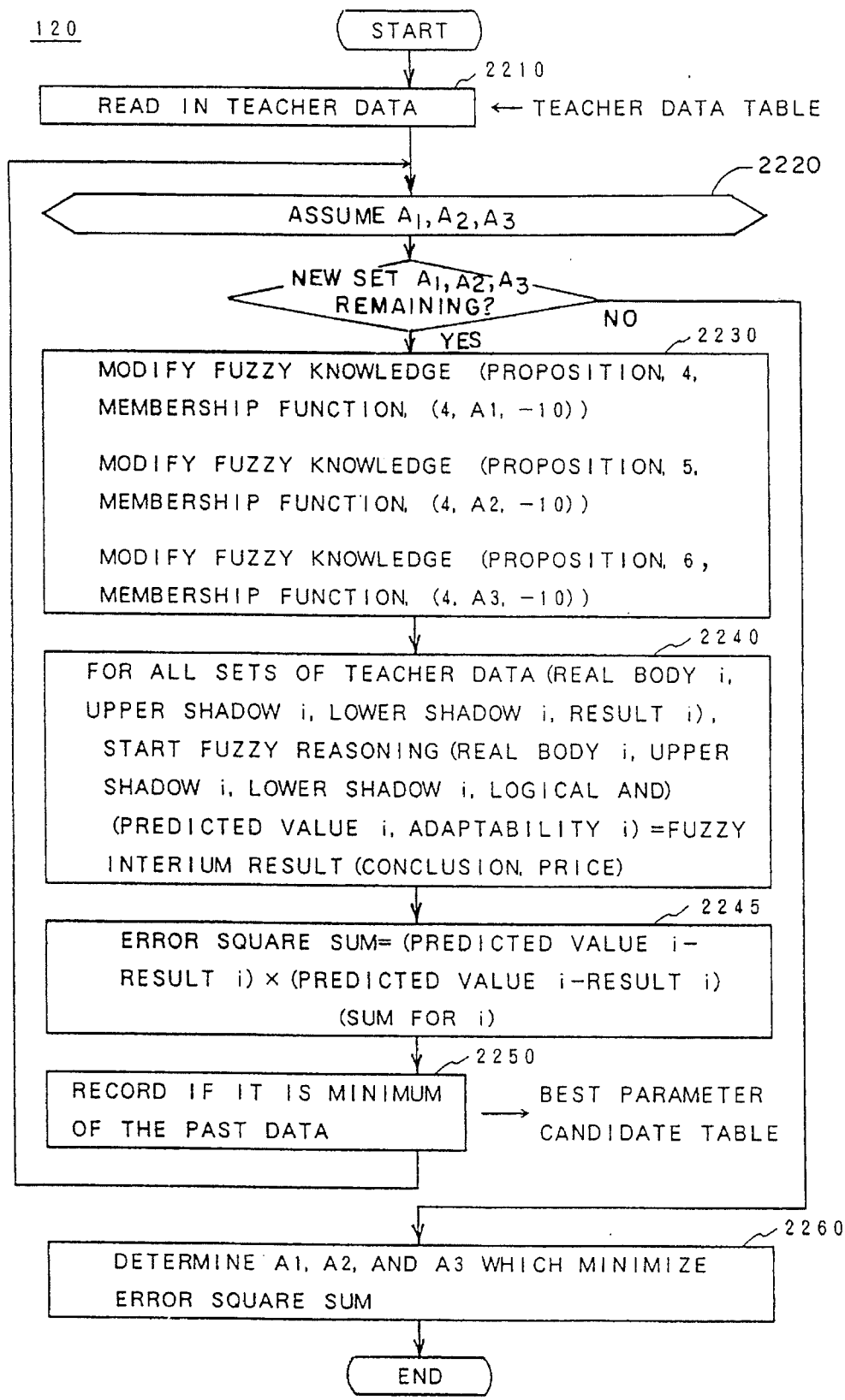
FIG. 17 shows a flow chart of a process in the fourth embodiment.

An example of the candle base is shown in FIG. 16A. The candle base is determined by the daily start value (price), end value, high value and low value. In the present embodiment, only the rule for the candle base (positive line) whose end value is higher than the start value is handled. The end value—start value, high value—end value, and start value—low value are called real body, upper shadow and low shadow, respectively.

The content of the fuzzy knowledge base 110 of the present embodiment is first explained. An example of the rule is shown in FIG. 16C. The rule table includes the following three rules.

Rule 1: if real body is long, then price goes up.
Rule 2: if upper shadow is long, then price goes down.
Rule 3: if lower shadow is long, the price goes up little.

For example, the rule 1 indicates know-how that if "real body" is long, that is, if the price has substantially gone up from the start value and settled at the end value, the quotations are strong and "price goes up" tomorrow, too.

A membership function is shown in FIG. 16B. Propositions 1, 2 and 3 correspond to "real body is long", "upper shadow is long" and "lower shadow is long", respectively, and the shapes of the membership functions are type 4 (TYPE 4 or larger in FIG. 14C), and the parameter values are also fixed. On the other hand, propositions 4, 5 and 6 correspond to "price goes up", "price goes down" and "price goes up little", respectively, and the shapes of the membership functions are type 7 (equal to TYPE 7 in FIG. 14C), and portions A1, A2 and A3 of the parameter values are not fixed.

The process of the control unit 120 in the present embodiment is now explained with reference to FIG. 17. Teacher data is read from the teacher data table (step 2210). As shown in FIG. 16D, the teacher data shows real body, upper shade, lower shade of the shape of the candle base and a variation of price as the result. A set of new values are then set in A1, A2 and A3 (step 2220). The knowledge modification unit 111 is accessed to modify the fuzzy knowledge in accordance with the new values in A1, A2 and A3 (step 2230). For each teacher data, the reasoning execution unit 130 is accessed to start the fuzzy reasoning, and the fuzzy cause readout unit 142 is accessed to read the conclusion of the reasoning as a predicted value (step 2240). A square sum of differences between the predicted values of the teacher data and the results read from the teacher data table is calculated (step 2245), and if it is smaller than a past minimum value, it is recorded in a best parameter table (step 2250). An example of the best parameter table is shown in FIG. 16E. In a step 2220, a new set of A1, A2 and A3 are set again. If there is no new set, A1, A2 and A3 of the best parameter table currently recorded are selected in a step 2260. In accordance with the present embodiment, a method for learning the fuzzy knowledge from the teacher data is attained. By programming the control unit in this manner, it is possible for the control unit 120 to repeatedly and automatically execute the fuzzy reasoning while sequentially modifying the fuzzy knowledge of the knowledge storage 121.

In the present embodiment, the membership function is dynamically defined and it need not be predefined by the editor or redefined even if the profit data increases year by year. Accordingly, the definition of the membership function is simplified.

Since it is converted to the format of high speed processing only once in the order of reasoning for the first branch office, the delay of reasoning can be avoided.

Since the reason for introducing the conclusion if explained by the text, even a person who is not familiar with the fuzzy reasoning system can understand the explanation.

Since the reasoning course can be obtained by the control unit, it is possible to conduct an own explanation by developing a program.

By utilizing the fuzzy knowledge base building support tool, it is not necessary to independently develop the reasoning program, and by using the reasoning explanation unit and the knowledge analysis unit, a better knowledge base may be developed in a more efficient manner.

Since it is possible to check whether the description of the condition part of the rule is missing or whether different conclusions were introduced under similar circumstances, based on the chart displayed by the knowledge analysis unit, a more refined knowledge base may be built.

Where the reasoning execution unit is realized by a separate hardware, high speed reasoning is attained.

In accordance with the present invention, since the fuzzy knowledge is dynamically defined, a large value of knowledge can be efficiently defined without human intervention. It is possible to automatically modify the knowledge with the change of data.

Because of the explanation unit for the reasoning, it is easy to explain the reason for the conclusion when the fuzzy reasoning is used for consultation.

Because of the analysis unit of knowledge, information useful for the verification of the knowledge is available and it is possible to build a better knowledge base in a more efficient manner.

We claim:

1. In a fuzzy reasoning system comprising a control Unit including a program stating a modification procedure of the fuzzy knowledge and an execution start procedure, a knowledge modification unit, a reasoning execution unit, a knowledge storage unit, a knowledge base unit and an external data storage unit, a method of fuzzy reasoning for effecting fuzzy reasoning based on dynamically defined fuzzy knowledge stored in the knowledge storage unit, the method comprising the steps of:

(a) editing the modification procedure of the fuzzy knowledge in said program of said control unit;

(b) transferring the fuzzy knowledge from the knowledge base unit to the knowledge storage unit;

(c) modifying the fuzzy knowledge in said knowledge storage unit in accordance with the edited modification procedure in said control unit; and, (d) executing the fuzzy reasoning by the reasoning execution unit based on the modified fuzzy knowledge in said knowledge storage unit in accordance with the execution start procedure in said control unit.

2. The method of fuzzy reasoning according to claim 1 wherein at least one of a fuzzy rule and a membership function in said knowledge storage is modified.

3. The method of fuzzy reasoning according to claim 1 wherein said step (d) repeats the fuzzy reasoning for the modified fuzzy knowledge in said knowledge storage unit by a number of times specified by the modification procedure edited at said step (a).

4. The method of fuzzy reasoning according to claim 1 wherein said steps (c) and (d) are together sequentially repeatedly executed by a number of times designated by said central processing unit.

5. The method of fuzzy reasoning according to claim 1, wherein the executing further comprises steps of:

storing the latest time of modification of the fuzzy knowledge in said knowledge storage unit and comparing the latest time with a previous compilation time of the fuzzy knowledge;

determining whether a conversion of the fuzzy knowledge in said knowledge storage unit to the latest time fuzzy knowledge is necessary when the latest time is more recent; and, converting the fuzzy knowledge to the more recent latest time fuzzy knowledge in accordance with the determining, and when the latest time fuzzy knowledge is not more recent, retaining an internal expression format of the fuzzy knowledge comprising the previous compilation time fuzzy knowledge for high speed processing.

6. The method of fuzzy reasoning according to claim 5 further comprising the step of subsequently storing the modified fuzzy knowledge in said knowledge storage unit into said knowledge base unit.

7. The method of fuzzy reasoning according to claim 1 further comprising the step of subsequently storing the modified fuzzy knowledge in said knowledge storage unit into said knowledge base unit.

8. The method of fuzzy reasoning according to claim 1 further comprising the steps of:

storing a fuzzy reasoning course into a reasoning course storage;

preparing a reasoning result in a form understandable by a user based on the content in said reasoning course storage wherein the form includes a selective extraction of the input data having a large influence on the reasoning result; and, supplying the reasoning result to an output device.

9. The method of fuzzy reasoning according to claim 1 further comprising the steps of:

converting a fuzzy role for visual display based on tile fuzzy knowledge in said knowledge storage; and, supplying said visual display to an output device.

10. A fuzzy reasoning apparatus comprising:

a control unit in a central processing unit wherein the control unit includes a program stating a modification procedure of fuzzy knowledge and an execution start procedure of fuzzy reasoning;

a knowledge base for storing the fuzzy knowledge;

a knowledge storage for storing the fuzzy knowledge therein from said knowledge base;

means connected to said control unit and said knowledge storage for modifying the fuzzy knowledge in said knowledge storage in accordance with the modification procedure in tile program of said control unit; and, means connected to said control unit and said knowledge storage for executing the fuzzy reasoning based on the modified fuzzy knowledge in said knowledge storage in accordance with the execution start procedure of said control unit.

11. The fuzzy reasoning apparatus according to claim 10 wherein said fuzzy reasoning execution means is included in a fuzzy reasoning processor independent from said central processing unit.

12. The fuzzy reasoning apparatus according to claim 10 wherein at least one of a fuzzy rule and a membership function of the fuzzy knowledge in said knowledge storage is modified.

13. The fuzzy reasoning apparatus according to claim 10 wherein said fuzzy reasoning execution means repeats fuzzy reasoning for the modified fuzzy knowledge in said knowledge storage by a number of times specified by the modification.

14. The fuzzy reasoning apparatus according to claim 10 wherein said fuzzy reasoning execution means repeats the execution of the fuzzy reasoning while modifying the fuzzy knowledge in said knowledge storage by a number of times designated by said central processing unit.

15. The fuzzy reasoning apparatus according to claim 10 further comprising:

means for storing the modified fuzzy knowledge in said knowledge storage into said ,knowledge base.

16. The fuzzy reasoning apparatus according to claim 10 further comprising:

a reasoning course storage for storing fuzzy reasoning course;

means for preparing a reasoning explanation in a text readily understandable by a user based on the content of said reasoning course storage; and an output device for outputting the reasoning explanation.

17. A fuzzy reasoning system comprising:

a central processing unit having a control unit and a knowledge base for storing fuzzy knowledge;

a knowledge storage for storing the fuzzy knowledge therein from said knowledge base;

automatic fuzzy knowledge modification means connected to said control unit and said knowledge storage for automatically modifying the fuzzy knowledge in said knowledge storage to generate modified fuzzy knowledge responsive to a first instruction from said control unit; and, means connected to said control unit and said knowledge storage for executing a fuzzy reasoning based on the modified fuzzy knowledge in said knowledge storage responsive to a second instruction from said control unit.

18. The fuzzy reasoning apparatus according to claim 17 further comprising:

means for converting a fuzzy rule to a visual display based on the fuzzy knowledge in said knowledge storage; and an output device for outputting the visual display.

19. The fuzzy reasoning apparatus according to claim 17 further comprising means for storing the modified fuzzy knowledge in said knowledge storage into said knowledge base.

20. A fuzzy reasoning apparatus comprising a system including a central processing unit having a control unit and a knowledge base for storing fuzzy knowledge, the fuzzy reasoning apparatus comprising:

a knowledge storage for storing the fuzzy knowledge therein from said knowledge base;

means connected to said control unit and said knowledge storage for automatically modifying the fuzzy knowledge in said knowledge storage in accordance with a first instruction from said control unit, to generate modified fuzzy knowledge; and, fuzzy reasoning execution means connected to said control unit and said knowledge storage for executing a fuzzy reasoning based on the modified fuzzy knowledge in said knowledge storage in accordance with a second instruction from said control unit, said fuzzy reasoning execution means being included in a fuzzy reasoning processor apart from said central processing unit.

21. The fuzzy reasoning apparatus according to claim 20 further comprising:

means for converting a fuzzy role to a visual display based on the fuzzy knowledge in said knowledge storage; and, an output device for outputting the visual display.

22. The fuzzy reasoning apparatus according to claim 20 further comprising means for storing the modified fuzzy knowledge into said knowledge base.

23. A fuzzy reasoning apparatus comprising a system including a central processing unit having a control unit and a knowledge base for storing fuzzy knowledge, the fuzzy reasoning apparatus comprising:

a knowledge storage for storing the fuzzy knowledge therein from said knowledge base;

means connected to said control unit and said knowledge storage for automatically modifying the fuzzy knowledge in said knowledge storage in accordance with a first instruction from said control unit, to generate modified fuzzy knowledge; and, means connected to said control unit and said knowledge storage for executing a fuzzy reasoning based on the modified fuzzy knowledge in said knowledge storage in accordance with a second instruction from said control unit, wherein at least a one of a fuzzy rule and a membership function of the fuzzy knowledge in said knowledge storage is modified.

24. The fuzzy reasoning apparatus according to claim 23 further comprising:

means for converting a fuzzy role to a visual display based on the fuzzy knowledge in said knowledge storage; and, an output device for outputting the visual display.

25. The fuzzy reasoning apparatus according to claim 23 further comprising means for storing the modified fuzzy knowledge into said knowledge base.

26. A fuzzy reasoning apparatus comprising a system including a central processing unit having a control unit and a knowledge base for storing fuzzy knowledge, the fuzzy reasoning apparatus comprising:

a knowledge storage for storing the fuzzy knowledge therein from said knowledge base;

means connected to said control unit and said knowledge storage for automatically modifying the fuzzy knowledge in said knowledge storage generating modified fuzzy knowledge in accordance with a first instruction from said control unit; and, fuzzy reasoning execution means connected to said control unit and said knowledge storage for executing a fuzzy reasoning based on the modified fuzzy knowledge in said knowledge storage in accordance with a second instruction from said control unit, said fuzzy reasoning execution means including means for repeating a fuzzy reasoning to the modified fuzzy knowledge in said knowledge storage a number of times specified by a modification procedure.

27. A fuzzy reasoning apparatus comprising a system including a central processing unit having a control unit and a knowledge base for storing fuzzy knowledge, the fuzzy reasoning apparatus comprising:

a knowledge storage for storing the fuzzy knowledge therein from said knowledge base;

means connected to said control unit and said knowledge storage for automatically modifying the fuzzy knowledge in said knowledge storage in accordance with a first instruction from said control unit to generate a modified fuzzy knowledge; and, fuzzy reasoning execution means connected to said control unit and said knowledge storage for executing a fuzzy reasoning based on the modified fuzzy knowledge in said knowledge storage in accordance with a second instruction from said control unit, wherein said fuzzy reasoning execution means includes means for repeating the execution of the fuzzy reasoning while modifying the fuzzy knowledge in said knowledge storage by a number of times designated by said central processing unit.

28. A fuzzy reasoning apparatus comprising a system including a central processing unit having a control unit and a knowledge base for storing fuzzy knowledge, the fuzzy reasoning apparatus comprising:

a knowledge storage for storing the fuzzy knowledge therein from said knowledge base;

means connected to said control unit and said knowledge storage for automatically modifying the fuzzy knowledge in said knowledge storage in accordance with an instruction from said control unit to generate a modified fuzzy knowledge;

fuzzy reasoning execution means connected to said control unit and said knowledge storage for executing a fuzzy reasoning based on the modified fuzzy knowledge in said knowledge storage in accordance with an instruction from said control unit;

a reasoning course storage for storing an intermediate course of the fuzzy reasoning;

means for preparing a reasoning explanation in a sentence readily understandable by a user based on a content of said reasoning course storage; and, an output device for outputting the sentence, wherein said reasoning explanation means includes means for executing the following steps:

selecting a subject of a conclusion part to be explained;

selecting a maximum value of a membership function of conclusion;

selecting a contribution rule for providing the maximum value;

selecting a contribution subject from propositions of a condition part of the contribution rule;

selecting a contribution subject, an input value and a predicate; and, selecting a predicate most adaptable to the input value from predicates of subjects.

29. A fuzzy reasoning apparatus comprising a system including a central processing unit having a control unit and a knowledge base for storing fuzzy knowledge, the fuzzy reasoning apparatus comprising:

a knowledge storage for storing the fuzzy knowledge therein from said knowledge base;

means connected to said control unit and said knowledge storage for automatically modifying the fuzzy knowledge in said knowledge storage in accordance with an instruction from said control unit to produce modified fuzzy knowledge;

fuzzy reasoning execution means connected to said control unit and said knowledge storage for executing a fuzzy reasoning based on the modified fuzzy knowledge in said knowledge storage in accordance with an instruction from said control unit;

means for converting a fuzzy rule to analysis chart information based on the fuzzy knowledge in said knowledge storage; and, an output device for outputting the analysis chart information in an analysis chart display, wherein said fuzzy rule converting means includes means for executing the following steps:

selecting data for an abscissa and an ordinate of the analysis chart display from subjects of condition parts of rules;

selecting data whose rule distribution is to be observed from subjects of conclusion parts of rules;

setting a minimum adaptability as a range of each of the rules to be shown on the analysis chart; and, determining ranges of ordinate of abscissa for each rule.

30. A fuzzy reasoning apparatus comprising:

a control unit for generating a fuzzy knowledge modification procedure and a fuzzy reasoning execution start procedure;

a knowledge storage for storing fuzzy knowledge;

a knowledge modification unit connected to said control unit and to said knowledge storage for automatically modifying fuzzy knowledge in the knowledge storage based on said fuzzy knowledge modification procedure generated by said control unit; and, a fuzzy reasoning execution unit for executing a fuzzy reasoning based on the modified fuzzy knowledge in the knowledge storage responsive to said fuzzy reasoning execution start procedure.

31. A fuzzy reasoning method in a fuzzy reasoning system including a control unit, the method comprising:

providing a fuzzy knowledge modification procedure;

editing the fuzzy knowledge modification procedure;

automatically modifying fuzzy knowledge in a storage unit in accordance with said edited fuzzy knowledge modification procedure; and, executing a fuzzy reasoning procedure based on the modified fuzzy knowledge.

* * * * *

UNITED STATES PATENT AND TRADEMARK OFFICE
CERTIFICATE OF CORRECTION

PATENT NO. : 5,471,559
DATED : November 28, 1995
INVENTOR(S) : Chizuko Yasunobu, et al.

It is certified that error appears in the above-indentified patent and that said Letters Patent is hereby corrected as shown below:

Claim 9, column 10, line 67, delete "tile" and insert therefor --the--.

Claim 10, column 11, line 14, delete "tile" and insert therefor --the--.

Claim 24, column 12, line 58, delete "role" and insert therefor --rule--.

Signed and Sealed this

Twentieth Day of February, 1996

Attest:

BRUCE LEHMAN

*Attesting Officer*  *Commissioner of Patents and Trademarks*